United States Patent
Reichenbach-klinke et al.

(10) Patent No.: US 8,470,907 B2
(45) Date of Patent: Jun. 25, 2013

(54) ADDITIVE FOR CEMENTING WELLS

(75) Inventors: Roland Reichenbach-klinke, Traunstein (DE); Tinton Setiawan, Banyumas (ID); Johann Plank, Trostberg (DE)

(73) Assignee: BASF SE, Ludwigshafen (DE)

( * ) Notice: Subject to any disclaimer, the term of this patent is extended or adjusted under 35 U.S.C. 154(b) by 49 days.

(21) Appl. No.: 12/812,087

(22) PCT Filed: Jan. 19, 2009

(86) PCT No.: PCT/EP2009/050551
§ 371 (c)(1),
(2), (4) Date: Aug. 31, 2010

(87) PCT Pub. No.: WO2009/103579
PCT Pub. Date: Aug. 27, 2009

(65) Prior Publication Data
US 2010/0317764 A1   Dec. 16, 2010

(30) Foreign Application Priority Data
Feb. 23, 2008 (DE) .................... 10 2008 010 795

(51) Int. Cl.
C09K 8/00 (2006.01)
C04B 7/00 (2006.01)
C04B 40/00 (2006.01)
E21B 33/00 (2006.01)
C08G 6/02 (2006.01)
C08L 61/02 (2006.01)

(52) U.S. Cl.
USPC ........... 523/130; 106/638; 106/823; 166/285; 525/521

(58) Field of Classification Search
USPC ........................................ 523/130
See application file for complete search history.

(56) References Cited

U.S. PATENT DOCUMENTS

| | | | |
|---|---|---|---|
| 3,347,789 A * | 10/1967 | Dickson et al. | 166/305.1 |
| 3,491,049 A * | 1/1970 | Gibson et al. | 524/8 |
| 4,469,518 A | 9/1984 | McKenzie | |
| 4,482,381 A * | 11/1984 | Spitz et al. | 106/719 |
| 4,482,383 A * | 11/1984 | McKenzie | 106/694 |
| 4,742,094 A | 5/1988 | Brothers et al. | |
| 4,791,989 A | 12/1988 | Brothers et al. | |
| 5,340,860 A | 8/1994 | Brake et al. | |
| 5,389,706 A * | 2/1995 | Heathman et al. | 166/293 |
| 6,616,753 B2 * | 9/2003 | Reddy et al. | 106/718 |
| 2003/0121661 A1 | 7/2003 | Reddy et al. | |
| 2006/0122071 A1 * | 6/2006 | Reddy et al. | 507/219 |
| 2008/0103255 A1 | 5/2008 | Reichenbach-Klinke et al. | |
| 2010/0144970 A9 | 6/2010 | Reichenbach-Klinke et al. | |

FOREIGN PATENT DOCUMENTS

| | | |
|---|---|---|
| DE | 10 2006 047 091 A1 | 4/2008 |
| DE | 10 2006 047091 A1 | 4/2008 |
| EP | 0 261 883 A2 | 3/1988 |
| EP | 0 444 542 A1 | 9/1991 |
| EP | 1 319 798 A1 | 6/2003 |
| WO | WO 99/16723 A1 | 4/1999 |

* cited by examiner

Primary Examiner — Peter F Godenschwager
Assistant Examiner — David Karst
(74) Attorney, Agent, or Firm — Fulbright & Jaworski LLP

(57) ABSTRACT

An additive based on a polyalkylenimine and a sulphonated formaldehyde-containing condensate and its use as a fluid loss additive in the cementing of wells in the mineral oil and natural gas sector is claimed. Polyethylenimine, polypropylenimine and polybutylenimine are suitable as typical representatives of the polyalkylenimines and may also be derivatised. Preferred condensates are acetone/formaldehyde resins. Those additives according to the invention which are subjected to maturing, in particular by allowing to stand, prior to their use achieve a particularly low fluid loss value.

21 Claims, No Drawings

ADDITIVE FOR CEMENTING WELLS

This application is a §371 of PCT/EP2009/050551 filed Jan. 19, 2009, and claims priority from DE 10 2008 010 795.6 filed Feb. 23, 2008.

The present invention relates to an additive based on a polyalkylenimine and a sulphonated formaldehyde-containing condensate and its use.

The use of polyalkylenimines and in particular polyethylenimine in construction chemistry compositions and here especially as so-called fluid loss additive is sufficiently well known. In this context, it is essential to use the respective polyalkylenimine together with a further component in order to achieve a sufficiently low fluid loss, since in particular the polyethylenimine alone cannot display such an effect.

A fluid loss additive is understood as meaning a chemical composition which is used for controlling the emergence (loss) of fluid and in particular of aqueous liquids from underground formations in association with the drilling of mineral oil and natural gas deposits. This fluid loss is a serious problem, particularly in the cementing of wells, since the aqueous phase of drilling fluids can adversely affect the characteristics and behaviour of the slurry and also the setting behaviour of the cement-containing composition used. Moreover, the uncontrolled emergence of fluid into or out of the underground formation generally causes pronounced damage to the rock formations, with the result that the permeability thereof shows a dramatic negative change.

U.S. Pat. No. 3,491,049 describes, for example, the use of polyethylenimine together with an anionic surface-active substance as a fluid loss additive. Sulphonated naphthalene is a typical representative of the surface-active substance used here.

A reaction product between a polyethylenimine and a high molecular weight sulphonated polymer, which according to U.S. Pat. No. 4,469,518 is preferably a sulphonated polystyrene, is likewise a fluid loss additive.

Fluid loss additives based on polyethylenimine are likewise disclosed in U.S. Pat. Nos. 4,742,094 and 4,791,989. According to U.S. Pat. No. 4,742,094, polyethylenimine is used together with a sulphonated organic compound, which is a lignosulphonate or a sulphonated naphthalene-formaldehyde condensate. The same composition is used in the method for cementing a well according to U.S. Pat. No. 4,791,989.

U.S. Pat. No. 5,340,860 teaches the use of a combination of polyethylenimine, a sulphonated naphthalene/formaldehyde condensate and an alkylbenzenesulphonate as a fluid loss additive.

The prior art therefore discloses exclusively fluid loss additives which contain a combination of polyethylenimine with a sulphonated naphthalene, a sulphonated polystyrene, a sulphonated naphthalene/formaldehyde resin or a lignosulphonate.

As already described, the uncontrolled emergence of fluids in underground rock formations during the exploitation of mineral oil and natural gas deposits constitutes a considerable problem which can be well controlled to some extent by the existing fluid loss additives but nevertheless may in some cases still entail incalculable risks. For the present invention, it was therefore the object to provide additional fluid loss additives based on a polyalkylenimine and a sulphonated formaldehyde-containing condensate. These novel additives should ideally have a substantially improved effect in combination with a simultaneously optimised cost-efficiency compared with the known admixtures. Moreover, they should be accessible without problems by the use of generally available starting materials.

This object was achieved by a corresponding additive which contains a sulphonated ketone/formaldehyde resin as the condensate.

Surprisingly, it has been found that not only could the object be completely achieved with this novel additive but that it results in a further substantially reduced fluid loss compared with the compositions used to date, it also being possible to control the fluid loss effect via the standing time of the additive or via the maturing thereof.

It has been found to be advantageous overall if at least one compound of the series consisting of polyethylenimine, polypropylenimine and polybutylenimine is present in the additive as a typical representative of the alkylenimine component. In particular, polyethylenimines, which may also be substituted, have proved to be particularly suitable. N-Methyl-, N-acetyl- and N-butylpolyethylenimine may be mentioned here.

According to the present invention, polyethylenimines having the general formula $(C_2-H_5N)$, with a preferred molecular weight Mw of 10 000 to 3 500 000 g/mol are particularly suitable. Molecular weights Mw of 1 000 000 to 3 000 000 g/mol and in particular of 1 500 000 to 2 500 000 g/mol are to be regarded as being particularly advantageous.

Additives in which the condensate contains at least one member of the mono- and diketones and preferably acetone, butanone, pentanone, hexanone and cyclic ketones, such as cyclohexanone, as the ketone component are regarded as being preferred in the context of the present invention. Acid/formaldehyde resins are particularly suitable.

In general, the additive according to the invention is not subject to any limitations at all with regard to the distribution of the components present therein. However, it is particularly advantageous if the polyethylenimine and the condensate are present in the mass ratio of 20 to 1:1, preferably 15 to 5:1 and in particular 11 to 9:1.

Also regarding the condensate present in the additive, the claimed additive can be varied within wide ranges, which is also true in particular for the ketonic members already mentioned above. In certain applications, however, it has proved to be particularly advantageous if a mixture of at least one ketone/formaldehyde resin and a sulphonated naphthalene or melamine/formaldehyde condensate and/or a polycarboxylate ether is present as the condensate. The proportion of ketone/formaldehyde resin should be in a range from 40 to 90% by weight, ranges of 50 to 80% and in particular 60 to 70% by weight being particularly preferred. The polycarboxylate ether component is preferably a copolymer consisting of two monomer units, the unit a) representing an olefinically unsaturated monocarboxylic acid comonomer or an ester or a salt thereof or an olefinically unsaturated sulphuric acid comonomer or a salt thereof, and the unit b) representing a comonomer of the general formula (I)

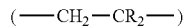

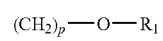

in which $R_1$ represents

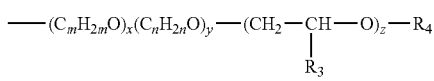

and $R_2$ represents H or an aliphatic hydrocarbon radical having 1 to 5 C atoms; $R_3$=unsubstituted or substituted aryl radical and preferably phenyl, and $R_4$=H or an aliphatic hydrocarbon radical having 1 to 20 C atoms, a cycloaliphatic hydrocarbon radical having 5 to 8 C atoms, a substituted aryl radical having 6 to 14 C atoms or a member of the series consisting of

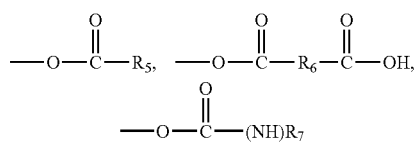

in which $R_5$ and $R_7$ in each case represent an alkyl, aryl, aralkyl or alkaryl radical and $R_6$ represents an alkylidene, arylidene, aralkylidene or alkarylidene radical, and p=0 to 3,
m, n=2 to 4;
x and y, independently of one another, denote 50 to 350 and z=0 to 200.

The additive according to the present invention should preferably be present as a dry mixture or as an aqueous solution. Moreover, it may contain, as a further component, an antifoaming agent (such as, for example, tributyl phosphate, members based on mineral oil or on silicone, silicone-free polymers) but also further admixtures customary in the oil field sector, such as, for example, rheology modifiers.

In addition to the additive itself, the present invention also claims the use thereof in the area of the development, the exploitation and the completion of underground mineral oil and natural gas deposits. The use thereof as a fluid loss additive in the cementing of wells in the mineral oil and natural gas sector and in deep wells is of primary importance.

In said applications, the additive should preferably be added to the cement-containing dry mixture and/or to the mixing water.

It has been found to be particularly surprising that the additive displays its fluid loss effect in a particularly significant manner if it is subjected to maturing before its addition to the cement-containing dry mixture and/or to the mixing water. For this ripening, the present invention envisages in particular allowing to stand over a relatively long period. Particularly if the additive stands over a period of at least 12 hours, preferably of at least 48 hours, particularly preferably of at least 10 hours and especially preferably of at least 30 days, it results in a particularly pronounced low fluid loss in the respective underground formations during its use. Overall, it may therefore be stated that the claimed additive produces particularly good water retentivity if the two main components, namely the polyalkylenimine and the ketone/formaldehyde condensate, are formulated and then allowed to stand for some time before being mixed into the cement slurry.

For this purpose, the additive according to the invention is ideally prepared in the form of a mixture of the two components polyethylenimine and condensate as an aqueous solution in a first step, before this solution, after standing for a relatively long time, is finally mixed in the second step with the cement-containing mixture, optionally the antifoam and further admixtures, and the remaining mixing water. Depending on the length of the standing time, an increasingly low fluid loss is found in practical use.

On the basis of this discovery, the present invention finally also takes into account a use variant in which the maturing is effected in aqueous solution and preferably in an at least 10% strength and particularly preferably in an at least 20% strength aqueous solution.

The following examples illustrate the described advantages of the present invention.

EXAMPLES

The preparation of the cement slurries and the determination of their properties (fluid loss, rheology) were effected according to API Recommended Practice for Testing Well Cements 10 B, 23rd. Edition, April 2002 (API 10B).

Example 1

This example illustrates the fact that the manner of mixing the cement slurry has a significant influence on the fluid loss-reducing properties of the additive according to the invention.

The following cement slurry was investigated for this purpose;

800 g Class G cement (Dyckerhoff Black Label)
1% bwoc of polyethylenimine Lupasol SK (BASF SE)
0.1% bwoc of acetone-formaldehyde-sulphite condensate Melcret K3F (BASF Construction Polymers GmbH)
352 g of demineralised water
1 g of antifoam (tributyl phosphate)

On stirring the cement slurry, first, as is customary in general practice, the pulverulent acetone-formaldehyde-sulphite condensate was dry-blended with the cement and then the mixing water, which already contained the liquid components polyethylenimine (PEI) and tributyl phosphate was added. A fluid loss of 332 ml which was substantially reduced compared with the prior art but still relatively high was observable. Alternatively, the additive mixture according to the invention comprising the two components polyethylenimine (PEI) and acetone-formaldehyde-sulphite condensate (AFS) was prepared as an aqueous solution in a first step. In a second step, this solution was stirred with the cement, the antifoam and remaining mixing water. According to this procedure, a fluid loss of 70 ml, which was once again substantially lower, was measured. As shown in the table below, a significant influence of the standing time of this additive solution prior to the addition thereof to the cement on the effect as a fluid loss additive is also observable:

| Standing time of the additive according to the invention prior to cement addition [min] | Fluid loss value [ml] |
|---|---|
| 5 | 76 |
| 900 | 32 |

Example 2

This example illustrates the fact that the additive according to the invention (batch 1) has improved properties compared with the combinations of polyethylenimine with other sulphonated polymers or plasticizers (comparative batches 2, 3, 4):

Rheology and fluid loss after mixing of the additives with the cement slurry according to standard procedure:

|   | Fluid Loss Additive | Fan Rheology 300 | 200 | 100 | 6 | 3 | 600 | Fluid Loss [ml] |
|---|---|---|---|---|---|---|---|---|
| 1 | 1% bwoc of PEI + 0.1% bwoc of AFS | 78 | 58 | 36 | 10 | 7 | 133 | 332 |
| 2 | 1% bwoc of PEI + 0.1% bwoc of naphthalene-formaldehyde-sulphite condensate (Melcret K2F, BASF Construction Polymers GmbH) | 77 | 57 | 34 | 8 | 6 | 131 | 433 |
| 3 | 1% bwoc of PEI + 0.1% bwoc of melamine-formaldehyde-sulphite condensate (Melment F10, BASF Construction Polymers GmbH) | 83 | 62 | 39 | 15 | 12 | 137 | 782 |
| 4 | 1% bwoc of PEI + 0.05% bwoc of polycarboxylate ether (Melflux 1641, BASF Construction Polymers GmbH)* | 65 | 46 | 25 | 7 | 2 | 124 | 483 |

Rheology and fluid loss after 5 min standing time of the respective PEI-plasticizer mixture before stirring of the cement slurry:

|   | Fluid Loss Additive | Fan Rheology 300 | 200 | 100 | 6 | 3 | 600 | Fluid-Loss [ml] |
|---|---|---|---|---|---|---|---|---|
| 1 | 1% bwoc of PEI + 0.1% bwoc of AFS | 64 | 44 | 24 | 4 | 2 | 119 | 76 |
| 2 | 1% bwoc of PEI + 0.1% bwoc of naphthalene-formaldehyde-sulphite condensate (Melcret K2F, BASF Construction Polymers GmbH) | 76 | 57 | 35 | 9 | 6 | 129 | 413 |
| 3 | 1% bwoc of PEI + 0.1% bwoc of melamine-formaldehyde-sulphite condensate (Melment F10, BASF Construction Polymers GmbH) | 80 | 60 | 38 | 12 | 11 | 133 | 735 |
| 4 | 1% bwoc of PEI + 0.05% bwoc of polycarboxylate ether (Melflux 1641, BASF Construction Polymers GmbH)* | 66 | 48 | 27 | 7 | 2 | 126 | 472 |

Rheology and fluid loss after 900 min standing time of the respective PEI/plasticizer mixture before stirring of the cement slurry:

|   | Fluid Loss Additive | Fan Rheology 300 | 200 | 100 | 6 | 3 | 600 | Fluid Loss [ml] |
|---|---|---|---|---|---|---|---|---|
| 1 | 1% bwoc of PEI + 0.1% bwoc of AFS | 60 | 39 | 19 | 3 | 2 | 114 | 32 |
| 2 | 1% bwoc of PEI + 0.1% bwoc of naphthalene-formaldehyde-sulphite condensate (Melcret K2F, BASF Construction Polymers GmbH) | 85 | 63 | 37 | 7 | 5 | 145 | 434 |
| 3 | 1% bwoc of PEI + 0.1% bwoc of melamine-formaldehyde-sulphite condensate (Melment F10, BASF Construction Polymers GmbH) | 75 | 55 | 32 | 5 | 4 | 132 | 542 |
| 4 | 1% bwoc of PEI + 0.05% bwoc of polycarboxylate ether (Melflux 1641, BASF Construction Polymers GmbH)* | 67 | 45 | 24 | 6 | 2 | 127 | 308 |

*Since pronounced sedimentation was observed on metering of 0.1% bwoc of the polycarboxylate ether, the amount was reduced to 0.05% bwoc here.

While no significant influence of the standing time of the PEI/plasticizer mixture on the fluid loss is observable with the use of naphthalene-formaldehyde-sulphite condensate, melamine-formaldehyde-sulphite condensate or polycarboxylate ethers (comparative batches 2, 3, 4), a significant reduction of the fluid loss value occurs in the case of the PEI/AFS combination according to the invention (batch 1).

The invention claimed is:
1. An additive comprising a polyalkylenimine and a sulphonated, formaldehyde-containing condensate, wherein the condensate is a mixture of at least one sulphonated ketone/formaldehyde resin and a polycarboxylate ether.

2. A method of developing, exploiting or completing underground mineral oil and natural gas deposits comprising utilizing the additive of claim 1.

3. The method of claim 2, wherein the method further comprises cementing mineral oil and natural gas wells and deep wells, wherein the cement comprises the additive, and the additive is a fluid loss additive.

4. The method of claim 2, wherein the additive is added to a cement-containing dry mixture and/or to mixing water.

5. The method of claim 2, wherein the additive is subjected to maturing before it is added to a cement-containing dry mixture or to mixing water.

6. The method of claim 5, wherein the maturing is effected in aqueous solution.

7. The method of claim 6, wherein the aqueous solution is at least 10% strength.

8. The method of claim 7, wherein the aqueous solution is at least 20% strength.

9. The additive of claim 1, wherein the polyalkylenimine is polyethylenimine.

10. The additive of claim 9, wherein the polyethylenimine and the condensate are present in a mass ratio of 20 to 1:1.

11. The additive of claim 9, wherein the polyethylenimine and the condensate are present in a mass ratio of 15 to 5:1.

12. The additive of claim 1, wherein the polyalkylenimine is N-methylpolyethylenimine.

13. The additive of claim 12, wherein the N-methylpolyethylenimine has a molecular weight Mw of from 10,000 to 3,500,000 g/mol.

14. The additive of claim 13, wherein said Mw is from 1,000,000 to 3,000,000 g/mol.

15. The additive of claim 14, wherein the Mw is from 1,500,000 to 2,500,000 g/mol.

16. The additive of claim 12, wherein the N-methylpolyethylenimine and the condensate are present in a mass ratio of 11 to 9:1.

17. The additive of claim 1, wherein the sulphonated ketone is selected from the group consisting of a monoketone, a diketone and a cyclic ketone.

18. The additive of claim 1, wherein the ketone of the sulphonated ketone is selected from the group consisting of acetone, butanone, pentanone, hexanone and cyclohexanone.

19. An additive comprising a polyalkylenimine and a sulphonated, formaldehyde-containing condensate, wherein the condensate is a sulphonated ketone/formaldehyde resin and wherein the polyalkylenimine is selected from the group consisting of polyethylenimine, polypropylenimine and polybutylenimine, and wherein the polyethylenimine comprises at least one member selected from the group consisting of N-methyl polyethylenimine, N-acetylpolyethylenimine and N-butylpolyethylenimine, wherein the proportion of the sulphonated ketone/formaldehyde resin in the condensate is in the range of from 40 to 90% by weight.

20. The additive of claim 19, present as a dry mixture or aqueous solution.

21. The additive of claim 19, further comprising an antifoaming agent.

* * * * *